United States Patent [19]

Edwards

[11] 4,202,158
[45] May 13, 1980

[54] CROP HARVESTING APPARATUS

[76] Inventor: John W. Edwards, P.O. Box 1151, Brandon, Fla. 33511

[21] Appl. No.: 843,177

[22] Filed: Oct. 18, 1977

[51] Int. Cl.² .................. A01D 46/00; A01D 46/22
[52] U.S. Cl. .................................. 56/328 R; 56/329
[58] Field of Search .............. 56/328 R, 328 TS, 329, 56/330

[56] References Cited

U.S. PATENT DOCUMENTS

| | | | |
|---|---|---|---|
| 3,210,921 | 10/1965 | Middlesworth et al. | 56/328 R |
| 3,222,855 | 12/1965 | Lasswell, Jr. | 56/328 R |
| 3,347,032 | 10/1967 | Pool et al. | 56/329 |
| 3,347,587 | 10/1967 | Frost | 56/328 R |
| 3,407,580 | 10/1968 | Murray | 56/328 R |
| 3,451,202 | 6/1969 | Murray | 56/328 R |
| 3,543,495 | 12/1970 | Harvey | 56/329 |
| 3,601,962 | 8/1971 | Townsend | 56/328 R |
| 3,624,991 | 12/1971 | Richard | 56/329 |
| 3,635,004 | 1/1972 | Webb et al. | 56/328 TS |
| 3,808,786 | 5/1974 | Bickens | 56/329 |
| 3,864,899 | 2/1975 | Lasswell | 56/328 R |
| 3,948,027 | 4/1976 | Edwards | 56/328 R |
| 3,979,891 | 9/1976 | Patton | 56/328 R |

*Primary Examiner*—Russell R. Kinsey
*Assistant Examiner*—Paul J. Hirsch
*Attorney, Agent, or Firm*—Beveridge, DeGrandi, Kline & Lunsford

[57] ABSTRACT

A crop harvesting apparatus particularly suited for harvesting of tree-borne crops. Each of a plurality of crop-severing rods has its first end rotatably connected to a support plate so that the rods extend substantially perpendicular to the plate. Each crop-severing rod includes a shaft member and a cover member. Each cover member has a substantially circular cross-section of undulant diameter. Preferably, the maximum undulant diameter of each rod is adjacent the minimum undulant diameter of adjacent rods. The rods are thrust among crop-bearing foliage and rotated to remove the crops from the foliage. In one embodiment a crop catcher is provided, including a flexible body member, capable of assuming a rolled position, adjacent the apparatus, and an extended position overlying an area of ground to catch crops severed from crop-bearing foliage by the crop-severing rods.

21 Claims, 7 Drawing Figures

CROP HARVESTING APPARATUS

BACKGROUND OF THE INVENTION

The present invention pertains to a crop harvesting apparatus. More particularly, the present invention pertains to an automated apparatus for the mechanized harvesting of crops and, in particular, tree-borne crops such as fruit, nuts and the like.

At the present time, many tree-borne crops such as fruit and nuts are harvested by hand. While attempts have been made to perfect mechanized crop harvesting apparatus, these have not been wholly successful heretofore. Many such apparatus have caused damage to the crop-bearing plant or to the crop itself. Likewise, many prior art apparatus have been unable to pick crops with great enough efficiency or speed to be economically successful. Fruit trees must not be damaged to any extent during the harvesting of fruit, or the trees will yield less fruit in subsequent crops. Thus, mechanized fruit harvesting apparatus must be capable of removing the fruit from the tree without removing an excessive quantity of leaves and branches. Removal of even a small quantity of leaves and branches is undesirable, even though that may not cause appreciable damage to the trees, since such leaves and branches must be removed from among the fruit before marketing. Likewise, the fruit itself must not be damaged to any great extent if it is to be marketable. While fruit which is intended for processing need not be in perfect condition, still it cannot be damaged excessively or it will be unsuited even for processing. Citrus fruit of the Valencia variety stays on the tree for over a year before it is ripe. As a consequence, at the time the Valencia fruit is harvested, the fruit tree is bearing unripened or green fruit of the new crop and ripened fruit of the crop to be harvested. An automatic crop harvesting apparatus must be capable of picking the ripe Valencia fruit while leaving the unripened fruit.

I previously have proposed crop harvesting apparatus which have provided improved harvesting over earlier forms of mechanized crop harvesters. Thus, U.S. Pat. No. 3,646,741 discloses a crop harvesting apparatus which includes an elongated hollow cylindrical shell with a plurality of crop-entry openings for the entry of the crops. Each crop-entry opening terminates in a crop-severing edge. The shell is thrust lengthwise among the crops and rotated, removing crops from the plant. Each crop-entry opening is provided with a closure or door which prevents mature, ripened fruit from leaving via the crop-entry opening, while permitting immature green fruit, leaves, and branches to pass from the shell without being severed from the plant. While this apparatus performs better than previously available mechanized crop harvesting devices, still shortcomings exist. The closures or doors on the crop-entry openings slow operation of the apparatus. While the apparatus does not remove so many leaves from the trees as to cause appreciable damage to the trees, still some leaves are removed and mixed with the harvested crops. This necessitates separating these leaves from the crops before marketing of the crops.

Likewise, my U.S. Pat. No. 3,992,861 discloses a crop harvesting apparatus in which a plurality of crop-severing devices are mounted on rotatable drive shafts. The crop-severing devices can take any of several forms. Thus, for example, they might be arcuate members including a crop engaging portion and a crop passage portion terminating in a crop-severing edge. Alternatively, the crop severing devices can be one or more crop-severing rods mounted onto a rotatable drive shaft and they might include a set of foliage-lifting rods which rotate more slowly than do the crop-severing rods. The crop-severing devices are thrust into the crop bearing foliage with the direction of thrust being transverse the longitudinal axes of the crop-severing rods. Again, while improved performance is achieved, still this crop harvesting apparatus removes an undesirable amount of foliage and does not remove as high a percentage of mature fruit as is desirable.

Likewise, my later crop harvesting apparatus, disclosed in my United States Patent Application Ser. No. 508,903, filed Sept. 24, 1974 now abandoned, utilizes rotatable rods which are thrust end first among the crop bearing foliage with the direction of thrust being parallel with the longitudinal axes of the crop-severing rods. In one form of this apparatus the rods are felxible so that, as they rotate, they achieve an orbital path. Experience has shown, however, that even these rods do not remove as high a percentage of the mature fruit as is desirable.

SUMMARY OF THE INVENTION

The present invention is a crop harvesting apparatus which is particularly suited for the picking of crops, particularly tree-borne crops such as fruits and nuts, and which provides greater harvesting efficiency than previous mechanized crop harvesting apparatus, including my own previous apparatus, while not removing an undesirable amount of foliage from the crop-bearing plant. In accordance with the present invention, a crop harvesting apparatus is provided having a plurality of crop-severing rods and a suppport plate. Each crop-severing rod includes an elongated shaft member with its first end rotatably mounted on the support plate with its longitudinal axis substantially perpendicular to the support plate. Each crop-severing rod further includes a cover mounted on the shaft and extending over at least a portion of the length of the shaft to rotate with the shaft. The cover of each crop-severing rod has a circular cross-section of undulant diameter. In a preferred embodiment of the present invention, adjacent crop-severing rods are longitudinally staggered so that the maximum undulation diameters of each crop-severing rod are adjacent the minimum undulation diameters of the neighboring crop-severing rods.

To harvest tree-borne crops, the crop-severing rods are thrust end first into the crop-bearing foliage and rotated. The staggering of the maximum and minimum undulation diameters assures that crops of mature size are contacted by crop-severing rods and removed from the foliage.

The staggering of the maximum and minimum undulation diameters results in adjacent crop-severing rods being of different lengths. As a consequence, not all of the crop-severing rods make their first contact with the crop-bearing foliage at the same time, and so the thrusting of the rods among the foliage is eased.

In another aspect, the present invention is a crop harvesting apparatus including a number of crop-severing members and a crop catcher. The crop catcher has a flexible body portion, capable of assuming a rolled position and an extended position, and a frame mounting the flexible body member. The flexible body member can assume its rolled condition when crops are not being harvested, and can assume its extended position during the harvesting of crops. In this extended position, the flexible body member unrolls, similar to the lowering of a window shade, and overlies an area of ground to catch crops severed from crop-bearing foliage by the crop-severing members.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

DETAILED DESCRIPTION OF THE INVENTION

Figure 1:
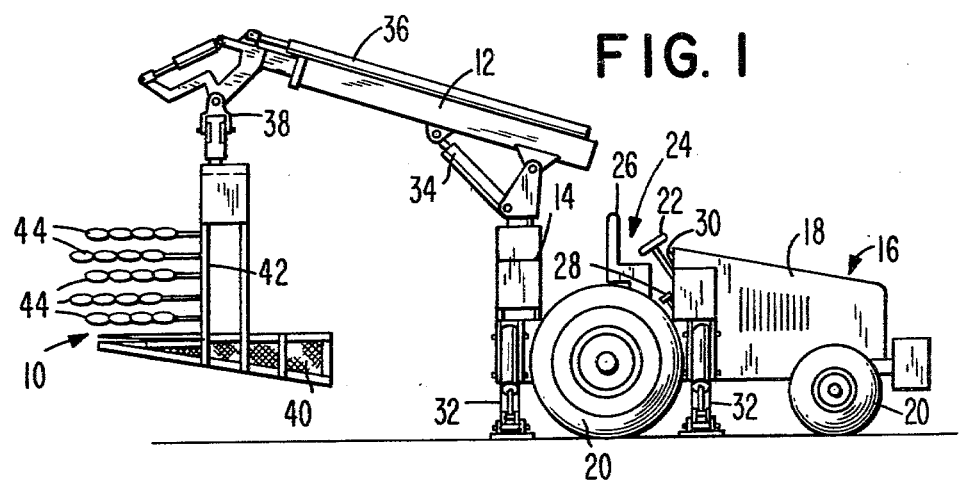
FIG. 1 is a side elevational view of a first embodiment of crop harvesting apparatus in accordance with the present invention mounted for movement among crop-bearing foliage.

FIG. 1 depicts a crop harvesting apparatus 10 in accordance with the present invention mounted at the end of a boom 12 which, in turn, is rotatably and pivotally supported on rotatable mount 14 of a tractor 16. Tractor 16 includes the usual components necessary for movement of the tractor and of the crop harvesting apparatus 10 in the desired manner. Thus, for example, tractor 16 might include an engine and a transmission within compartment 18, wheels 20 and brakes. If desired, oversize tires can be provided on wheels 20 to aid in movement on soft surfaces such as sand. Some or all of the wheels 20 can be coupled by the transmission to the engine for driving, while some or all of the wheels are steerable by means of steering wheel 22 positioned at operator's location 24. Operator's location 24 also includes a seat 26 for an operator and controls such as pedals 28, including for example an accelerator pedal and a brake pedal, and hand operated controls 30. Preferably, tractor 10 includes a number of stabilizing legs 32 to insure stability of the tractor when boom 12 is extended from support station 14. Boom 12 is preferably rotatably mounted to permit rotation thereof through 360° in a horizontal plane, and pivotally mounted to permit raising and lowering thereof, for example by means of hydraulic cylinder 34. Preferably also, boom 12 is telescopically extendible, for example, by means such as hydraulic cylinder 36.

Crop harvesting apparatus 10 is suspended from the outer end of boom 12 by means of mounting member 38 which, by way of example, might be a universal joint permitting apparatus 10 to hang freely from the end of boom 12 so that the weight of the crop harvesting apparatus causes the apparatus to level itself. Preferably, the outer end of boom 12 is angled, as depicted in FIG. 1, to assure that crop harvesting apparatus 10 does not bump against the boom. If desired, shock absorbers can be provided to assure that the crop harvesting apparatus does not swing rapidly. Various of the controls such as hand operated controls 30 control movement of crop harvesting apparatus 10. Controls 30 can be coupled to actuators at crop harvesting apparatus 10 by means of suitable electric and/or hydraulic cables (not shown). In the embodiment of harvesting apparatus depicted in FIG. 1 the crop harvesting apparatus 10 is provided with a crop catching basket 40 mounted at the lower extremity of the crop harvesting apparatus so that, as crops are severed from crop-bearing foliage, the crops fall into basket 40. The lower surface of basket 40 can be hingedly connected to permit its lowering for the purpose of emptying the crops from the basket 40.

Figure 2:
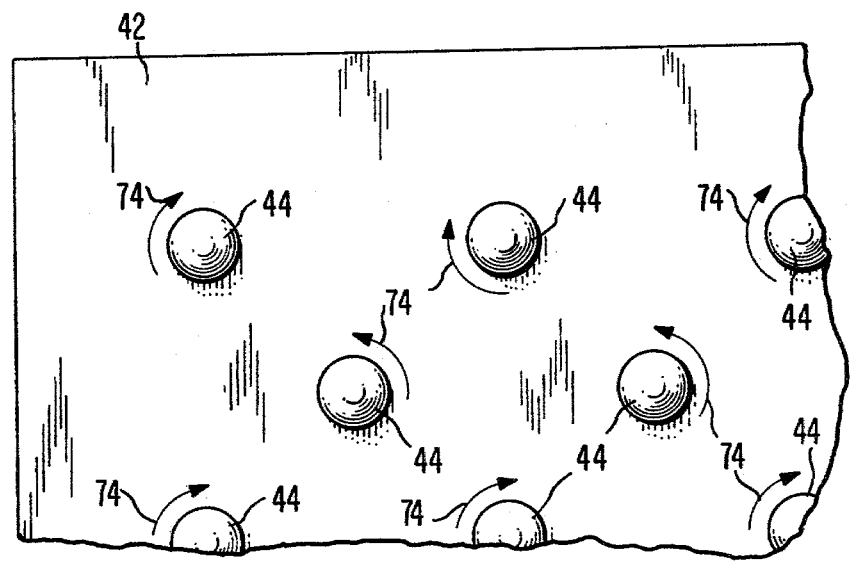
FIG. 2 is an enlarged, fragmentary, front elevational view of the crop harvesting apparatus of FIG. 1.

Crop harvesting apparatus 10 includes a support plate 42 which supports a plurality of crop-severing rods 44. As depicted in FIG. 2, preferably the crop-severing rods 44 are arranged on support plate 42 in a number of aligned rows, with the rods 44 of adjacent rows offset; that is, if viewed as horizontal rows, then the rods 44 of the adjacent rows are horizontally offset, or if viewed as vertical rows, then the rods 44 of adjacent rows are vertically offset, as seen from FIG. 2. Any number of rows of crop-severing rods 44 might be provided, typically from about 4 to about 10 rows, each row having any desired number of crop-severing rods 44, typically from about 4 to about 10 rods per row.

Figure 3:
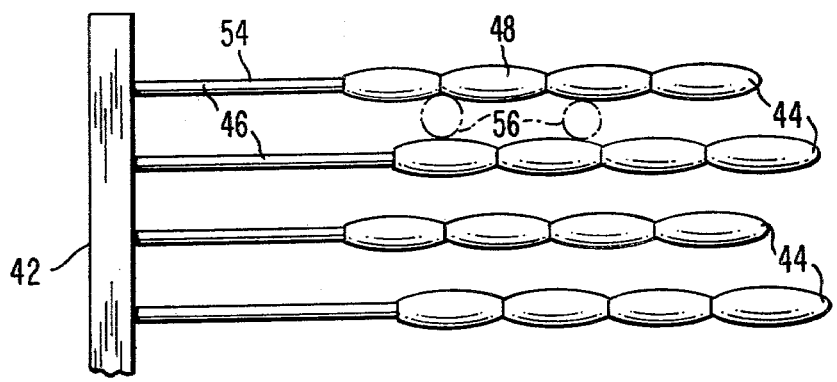
FIG. 3 is an enlarged, fragmentary, side elevational view of the crop harvesting apparatus of FIG. 1.
Figure 4:
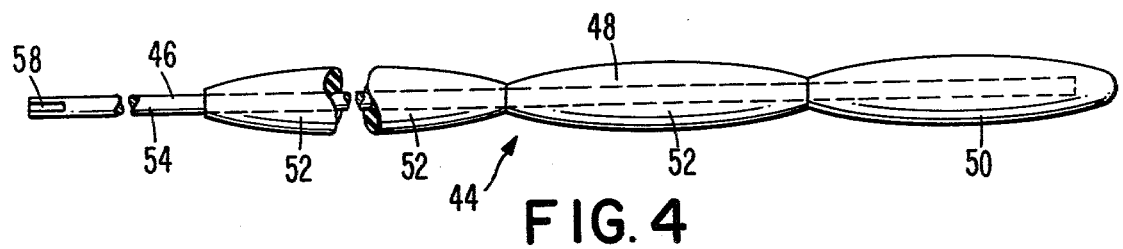
FIG. 4 is an enlarged, broken, side elevational view of a single crop-severing rod suitable for incorporation into the crop harvesting apparatus of the present invention.

As depicted in FIGS. 3 and 4, each crop-severing rod 44 includes an elongated shaft 46 and a cover 48. Shaft 46 is an elongated cylindrical member extending substantially the full length of the crop-severing rod 44. Cover 48 extends over a major portion of shaft 46 but a portion 54 of each shaft 46 may be uncovered, adjacent support plate 42. At any location over its length, cover 48 has a substantially circular cross-section. The diameter of cover 48 undulates over the length of cover 48. By way of example, the diameter of the cover 48 of each rod 46 might include four undulations over the length of the cover.

As depicted in FIG. 4, preferably cover 48 is formed of separate sections corresponding to the undulations of the cover diameter. Thus FIG. 4 depicts cover 48 as including an outer end section 50 and a plurality of identical inner sections 52. The diameter of the circular cross-section of each section 50, 52 of cover 48 varies over the length of the cover section from minimum diameters adjacent each end of each section 50 and 52 to a maximum diameter at approximately the longitudinal center of each section. Each cover section 50 and 52 might have a length in the order of about one foot and a maximum diameter in the order of about one inch. With four cover sections 50 and 52, then, cover 48 would have an overall length of in the order of four feet. Shaft 46 extends substantially the length of rod 44, terminating at a point in the order of about one to six inches, preferably about three inches, from the closed outer end of outer cover section 50. The uncovered portions 54 of the shafts 46 of adjacent rods 44 are of differing lengths, so that adjacent rods 44 have different overall lengths, as seen from FIG. 3. By way of example, alternate ones of the rods 44 might have uncovered shaft portions 54 of a length in the order of about two feet, while the intervening rods 44 might have uncovered shaft portions 54 of a length in the order of about two and one-half feet, giving overall rod lengths in the order of about six feet and six-and-one-half feet, respectively. As a consequence, the maximum undulation diameter points of each cover 46 are adjacent the minimum undulation diameter points of the covers of the adjacent rods 44, as seen in FIG. 3. This increases the likelihood that the fruit, such as fruit 56 depicted in FIG. 3, will be contacted and severed from the fruit-bearing plant.

Shafts 46 are formed of a suitable material, for example a glass fiber material or a metal. Covers 48 are formed of a compatible material such as an elastomeric material, for example a relatively hard rubber. Covers 48 then prevent crop harvesting apparatus 10 from causing damage to the bark on the tree limbs as crops are harvested. Each section 50 and 52 of harvester cover 48 is adhered to shaft 46, for example by means of a suitable adhesive, so that cover 48 rotates with shaft 46. If desired, each shaft 46 can include a ridge positioned to seat the inner end of the innermost cover section 52 to aid in positioning the cover 48 during assembly. Preferably, each rod 44 is slightly flexible so that the rod flexes should it contact a heavy tree limb.

Figure 5:
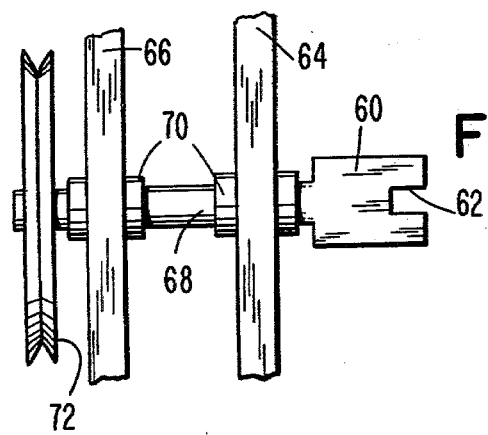
FIG. 5 is an enlarged, fragmentary, side elevational view depicting a device for mounting a crop-severing rod on a crop harvesting apparatus in accordance with the present invention.

The inner end of each shaft 46 is keyed, as depicted by grooves 58 on shaft 46 of FIG. 4. A number of mounting members, such as mounting member 60 of FIG. 5, are provided on support plate 42 to mount the several crop-severing rods 44. As shown in FIG. 5, the outer end of each mounting member 60 includes keying 62 to engage the keying 58 of rod 44, with rod 44 then being secured on mounting member 60, for example by means of set screws.

As illustrated in FIG. 5, support plate 42 preferably includes first plate member 64 and second plate member 66, each of which, by way of example, might be a steel plate with a thickness in the order of about one-half inch and with the plates 64 and 66 spaced apart in the order of about three to about six inches. Each mounting member 60 includes a shaft 68 which is rotatably mounted on plate members 64 and 66 by suitable bearings or journals 70. A driving device such as a pulley 72 is connected to the second end of shaft 68. As a consequence, the several crop-severing rods 44 can be rotated by a motor and drive belt engaging the several pulleys 72. Other suitable drive means could be utilized, of course, for example a gear drive. Preferably, the rods 44 are driven so that the rods of each horizontal row rotate in the same direction, while adjacent horizontal rows rotate in opposite directions, as indicated by arrows 74 in FIG. 2. As a consequence, the facing surfaces of adjacent rods move in the same direction, and so the fruit is severed from the limbs with less damage to the limbs.

Because the adjacent rods 44 are of different lengths, as crop harvesting apparatus 10 is thrust into the foliage of a crop-bearing plant, the adjacent rods contact the foliage at different intervals, easing penetration of the rods into the foliage. The positioning of the maximum undulation diameters of the covers 48 adjacent the minimum undulation diameters of the cover of the adjacent rods 44 increases the likelihood that all of the fruit on the crop-bearing plant is contacted, resulting in more rapid harvesting of the crop.

Figure 6:
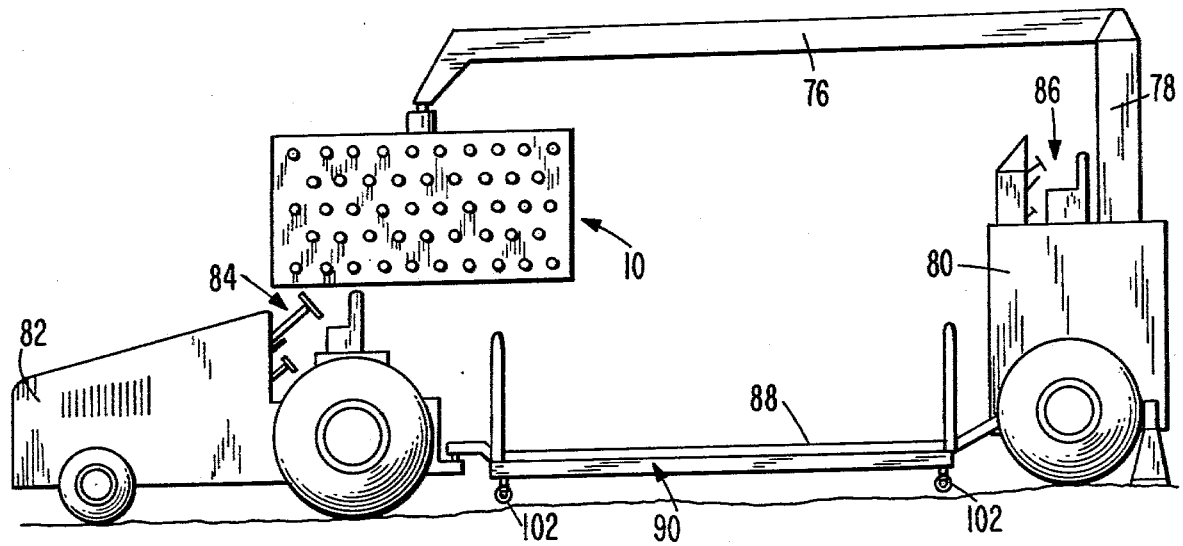
FIG. 6 is a side elevational view of a second embodiment of crop harvesting apparatus in accordance with the present invention.

FIG. 6 shows an embodiment of the present invention in which the crop harvesting apparatus 10 is suspended from one end of a boom 76 that is rotatably and pivotally mounted from support member 78 on trailer 80. Trailer 80 is towed by tractor 82 which has an operator's location 84. Harvesting apparatus 10 can be controlled either by an operator at an operator's location 84 on tractor 82 or by an operator at an operator's location 86 on trailer 80, as desired.

Figure 7:
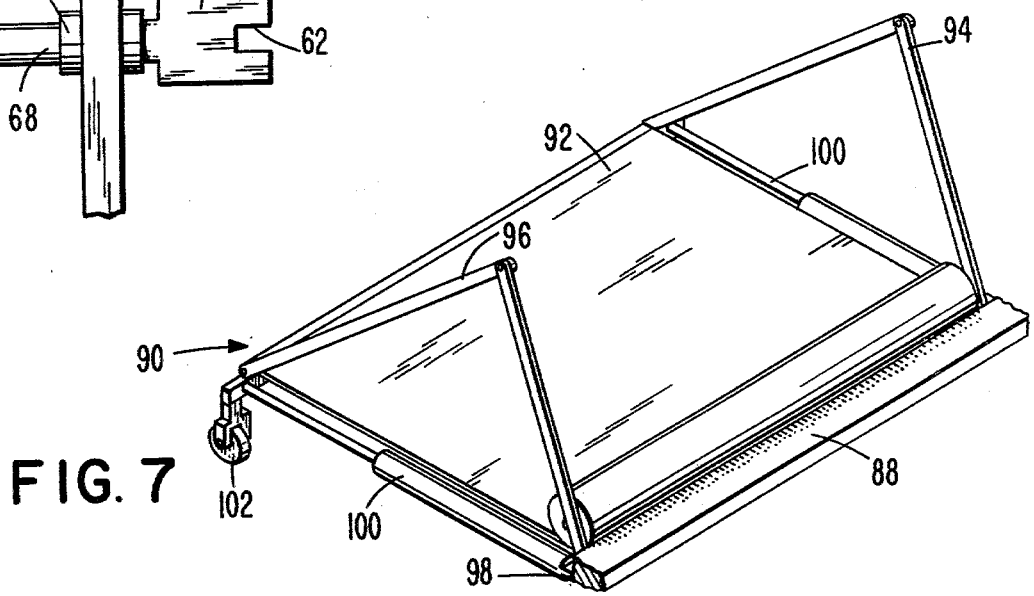
FIG. 7 is an enlarged, fragmentary, perspective view of a crop catcher suitable for incorporation into a crop harvesting apparatus in accordance with the present invention.

Trailer 80 includes an elongated connecting portion 88 between the tractor 82 and support member 78. A crop catcher 90 is mounted on connection portion 88. As seen in FIG. 7, crop catcher 90 includes a flexible body member 92 and a frame including first frame arm 94 and second frame arm 96. The inner end of flexible body member 92 is rolled about a spring-biased mounting member 98, adjacent connection portion 88. One end of each frame arm 94, 96 is pivotally mounted to connection portion 88. The second end of each frame arm 94, 96 is connected to the outer end of flexible body member 92. Each frame arm 94, 96 is hinged so that it can assume a folded position and an extended position. An actuation device such as a hydraulic or pneumatic piston 100 is positioned along each side of flexible body member 92 with its fixed end attached to connection portion 88 and its movable end attached to the outer end of flexible body member 92. As a consequence, when pistons 100 are withdrawn, flexible body member 92 is rolled about mounting member 98, and arms 94, 96 are folded. When pistons 100 are extended, arms 94, 96 unfold, and flexible body member 92 unrolls. Caster wheels 102 are provided to support the outer edge of flexible body member 92 on the ground. Actuation of pistons 100 can be controlled by an operator at either operator's station 84 or operator's station 86, with appropriate electrical, pneumatic, and/or hydraulic connections.

When the crop harvesting apparatus of FIG. 6 is to be transported from one location to another, flexible body member 92 is retracted to its rolled condition. When crops are to be harvested, pistons 100 are actuated to unroll flexible body member 92 and extend it to overlie the ground at the desired location so that, as crop harvesting apparatus 10 severs crops from the crop-bearing foliage, those crops are caught by flexible body member 92. If desired, a conveyor can be incorporated to remove the crops from body member 92 to a suitable transporting device such as a truck, Preferably, when flexible body member 92 is in its retracted position, wheels 102 are elevated above the ground for ease of movement of the overall device from location to location.

Although the present invention has been described with reference to the preferred embodiments, numerous modifications and rearrangements might be made and still the result would be within the scope of the invention.

What is claimed is:

1. A crop harvesting apparatus comprising:
   (a) a support plate;
   (b) a plurality of crop-severing rods, each including:
      (i) an elongated shaft member with a longitudinal axis and rotatably mounted on said support plate with its longitudinal axis extending substantially perpendicular to said support plate; and
      (ii) a cover member formed of a plurality of discrete, separate sectional pieces, each sectional piece having a substantially circular cross-section with a diameter varying from a minimum diameter adjacent the ends of the sectional piece to a maximum diameter at substantially the longitudinal center of the sectional piece, the plurality of sectional pieces positioned on said shaft member in abutting end-to-end relationship to extend with an undulant diameter over at least a portion of the length of said shaft member for rotation therewith;

(c) drive means for rotating each crop-severing rod shaft member in a continuous uni-directional rotational movement about its longitudinal axis;

(d) a crop catcher including:
  (i) a flexible body member capable of assuming a rolled position and an extended position; and
  (ii) frame means mounting said flexible body member with said support plate; and (e) control means for controlling movement of said flexible body member between its rolled position, adjacent said frame means, and its extended position, overlying an area of ground to catch crops severed from crop-bearing foliage by said crop-severing rods.

2. A crop harvesting apparatus as claimed in claim 1 in which said crop-severing rods are mounted on said support plate with the maximum undulant diameter points of each cover member substantially adjacent the minimum undulation diameter points of the cover members of the adjacent crop-severing rods.

3. A crop harvesting apparatus as claimed in claim 1 in which said crop-severing rods are mounted on said support plate in a plurality of horizontally aligned rows, and in which said drive means drives the rods of each row in the same rotational direction and drives the rods of adjacent rows in opposite rotational directions.

4. A crop harvesting apparatus as claimed in claim 1 in which said cover members are formed of rubber.

5. A crop harvesting apparatus as claimed in claim 4 in which said shaft members are formed of a glass fiber material.

6. A crop harvesting apparatus as claimed in claim 1 in which said frame means includes a pair of folding arm members, each having a first end, pivotally coupled with said support plate, and a second end, connected to said flexible body member, and in which said control means includes piston means for moving said folding arm members between a folded position, in which said flexible body member is in its rolled position, and an unfolded position, in which said flexible body member is in its extended position.

7. A crop harvesting apparatus as claimed in claim 1 in which each cover member sectional piece has a uniform internal diameter, substantially the same as the external diameter of said shaft members, with each sectional piece internal surface adhered to the outer surface of the associated shaft member over substantially the entire area of the sectional piece internal surface.

8. A crop harvesting apparatus comprising:
(a) a support plate;
(b) a plurality of crop-severing rods, each including:
  (i) an elongated shaft member with a lontitudinal axis and rotatably mounted on said support plate with its longitudinal axis extending substantially perpendicular to said support plate; and
  (ii) a cover member formed of a plurality of discrete, separate sectional pieces, each sectional piece having a substantially circular cross-section with a diameter varying from a minimum diameter adjacent the ends of the sectional piece to a maximum diameter at substantially the longitudinal center of the sectional piece, the plurality of sectional pieces positioned on said shaft member in abutting end-to-end relationship to extend with an undulant diameter over at least a portion of the length of said shaft member for rotation therewith; and (c) drive means for rotating each crop-severing rod shaft member in a continuous uni-directional rotational movement about its longitudinal axis.

9. A crop harvesting apparatus as claimed in claim 8 in which said crop-severing rods are mounted on said support plate with the maximum undulant diameter points of each cover member substantially adjacent the minimum undulation diameter points of the cover members of the adjacent crop-severing rods.

10. A crop harvesting apparatus as claimed in claim 8 in which said crop-severing rods are mounted on said support plate in a plurality of horizontally aligned rows.

11. A crop harvesting apparatus as claimed in claim 10 in which said drive means drives the rods of each row in the same rotational direction.

12. A crop harvesting apparatus as claimed in claim 11 in which said drive means drives the rods of adjacent rows in opposite rotational directions.

13. A crop harvesting apparatus as claimed in claim 10 in which the rods of adjacent rows are horizontally offset.

14. A crop harvesting apparatus as claimed in claim 8 in which each cover member has substantially the same maximum undulant diameter.

15. A crop harvesting apparatus as claimed in claim 8 in which said cover members are formed of rubber.

16. A crop harvesting apparatus as claimed in claim 15 in which said shaft members are formed of a glass fiber material.

17. A crop harvesting apparatus as claimed in claim 8 in which said shaft members are formed of a glass fiber material.

18. A crop harvesting apparatus as claimed in claim 8 in which each cover member sectional piece has a uniform internal diameter, substantially the same as the external diameter of said shaft members, with each sectional piece internal surface adhered to the outer surface of the associated shaft member over substantially the entire area of the sectional piece internal surface.

19. A crop harvesting apparatus comprising:
(a) a support plate;
(b) a plurality of crop-severing rods, each including:
  (i) an elongated shaft member with a longitudinal axis and rotatably mounted on said support plate with its longitudinal axis extending substantially perpendicular to said support plate; and
  (ii) a cover member formed of a plurality of discrete, separate sectional pieces, each sectional piece having a substantially circular cross-section with a diameter varying from a minimum diameter adjacent the ends of the sectional piece to a maximum diameter at substantially the longitudinal center of the sectional piece, the plurality of sectional pieces positioned on said shaft member in abutting end-to-end relationship to extend with an undulant diameter over at least a portion of the length of said shaft member for rotation therewith; and (c) drive means for rotating each crop-severing rod shaft member about its longitudinal axis.

20. A crop harvesting apparatus as claimed in claim 19 in which said crop-severing rods are mounted on said support plate with the maximum undulant diameter points of each cover member substantially adjacent the minimum undulation diameter points of the cover members of the adjacent crop-severing rods.

21. A crop harvesting apparatus as claimed in claim 19 in which each cover member sectional piece has a uniform internal diameter, substantially the same as the external diameter of said shaft members, with each sectional piece internal surface adhered to the outer surface of the associated shaft member over substantially the entire area of the sectional piece internal surface.

* * * * *